July 15, 1952     A. H. WILDE     2,602,945
ROTARY EGG CLEANER AND POLISHER BRUSH
Filed July 21, 1947
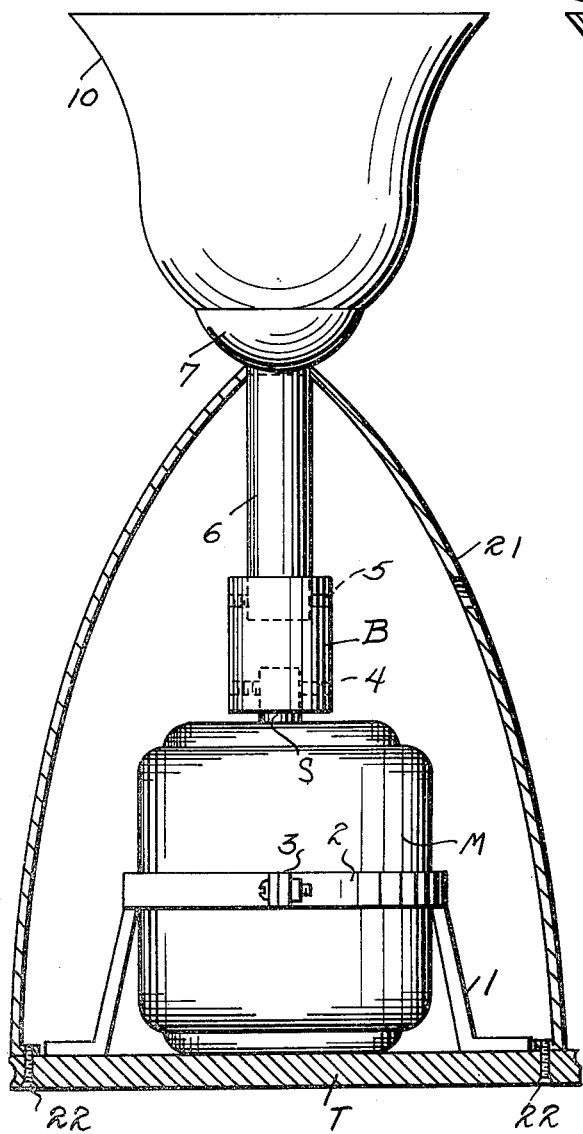
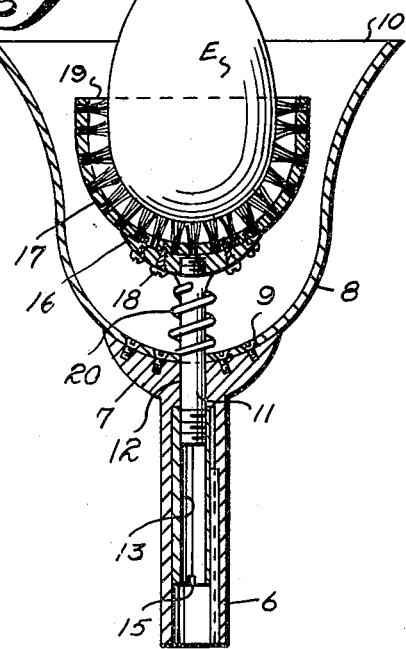
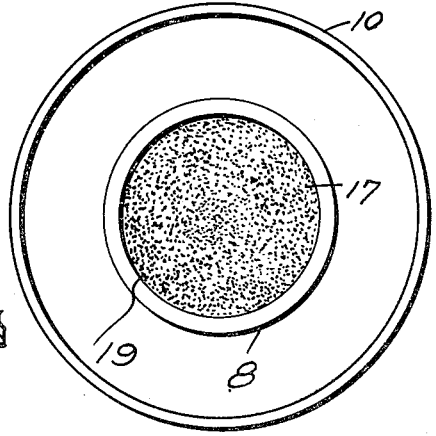
INVENTOR.
Alton H. Wilde
BY *Victor J. Evans & Co.*
ATTORNEYS Patented July 15, 1952

2,602,945

UNITED STATES PATENT OFFICE 2,602,945

ROTARY EGG CLEANER AND POLISHER BRUSH

Alton H. Wilde, Hannibal, N. Y.

Application July 21, 1947, Serial No. 762,243

1 Claim. (Cl. 15—3.1)

My present invention relates to the general class of power operated appliances for brushing, scrubbing and cleansing such commodities as fruits and vegetables, and more specifically to an improved egg cleaner and polisher of the rotary, vertical axis type, and operated by an electric motor or other suitable source of power.

The primary object of the invention is the provision of a manually controlled appliance of this character that is composed of a minimum number of component parts which may be manufactured with facility at low cost of production; and the parts may be assembled with convenience to constitute a cleaner and polisher that is simple in construction and operation, and by means of which an egg may be cleansed and polished with rapidity, with a minimum expenditure of time and labor.

To this end the invention consists in certain novel features of construction and combinations and arrangements of parts involving a manually depressed and resiliently supported, rotary, holder for an egg that performs the functions of a motor-operated cleaner and polisher, as hereinafter described in detail and more particularly set forth in the appended claim.

In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and structures, within the scope of my claim, without departing from the principles of the invention.

Figure 1 is a view in elevation embodying my invention, the exterior housing or stationary shell therefor being shown in section for convenience of illustration.

Figure 2 is a vertical sectional detail view of the depressible and spring-lifted holder and brush, together with a rotary tubular shaft and enclosing cup.

Figure 3 is a top plan view of the structure in Fig. 1.

The appliance of my invention may be supported upon a table T, or other desired stationary object, and an electric motor M having the usual electrical connections, and rotary vertical shaft S is employed for operating the cleaner and polisher. For supporting the appliance a frame 1 is mounted on the table, and its integral band 2 encircles the motor, and is clamped thereon at the joint 3.

The upper end of the vertical motor shaft S is equipped with a coupling collar or bushing B, and the bushing is rigidly clamped on the shaft as by set screws 4, while other clamp screws 5 rigidly fix the upper end of the bushing on the lower end of a rotary tubular shaft 6.

On the upper end of the tubular shaft an integral head 7 is provided and a semi-circular cup 8 is fastened in the dished face of the head by screws 9, while the wall of the cup outwardly and upwardly flares to form a comparatively large mouth 10.

For cleansing and polishing an egg as E, the latter is placed in a depressible, spring-lifted or resiliently supported and rotary, brushing holder, and the egg is depressed by hand in the brushing holder for cleansing and polishing its lower half, and then inverted and inserted in the brushing holder for cleansing and polishing its other half.

The brushing holder, which forms a receptacle for the egg, includes a stem or shank 11 having a slide bearing 12 in the head 7 of the tubular shaft 6, and the stem at its lower end is threaded in a coupling sleeve 13 that is splined within the tubular shaft. By inserting the stem through its bearing and the sleeve up through the open lower end of the tubular shaft, a screw driver may be applied to a kerf 15 of the sleeve 13, and the threaded end of the stem may be screwed into the tubular shaft, thus coupling the stem and the tubular shaft for rotation and permitting the brushing holder to reciprocate vertically with relation to the cup and the tubular shaft.

The combined brush and holder for the egg includes a brush head 16 that is threaded on the upper end of the stem 11, and the hemispherical or cup shaped body 17 of the brush is secured to this head as by screws 18.

For cleansing and polishing the egg while it is held stationary in the brushing-holder, the body of the brush is equipped with tufts of bristles 19, a pad of steel wool, or other suitable material that forms a seat for the egg. The brushing holder may be depressed against the tension of a spring 20 that is coiled about the stem 11 and interposed between the bottom of the cup 8 and the head 16 of the brushing holder, and when the cleansed and polished egg is lifted from the brushing receptacle, the spring lifts the receptacle into position for a second insertion of the egg. In this manner the necessary pressure for retaining the egg by hand in its rotary brush is resiliently resisted by the spring 20, and the egg is held in contact with the brush as it rotates for the required period of time for cleansing and polishing.

As a protection or enclosure for the motor and its connections a casing or housing 21 may be provided, that is provided with a flanged base and attached, as by screws 22 to the table or other support T.

Having thus fully described my invention, what I claim as new and desire to secure by Letters Patent is:

The combination in a rotary egg cleanser and polisher, with a supported motor and its vertical rotary shaft, of a tubular shaft rigid with the motor shaft, and a depressible coupling sleeve slidably mounted in the tubular shaft to revolve therewith, of a rotary depressible stem slidably mounted in the tubular shaft and coupled at one end with the sleeve, an egg brushing-holder mounted on the other end of the stem, and a compressible spring located on the stem between the holder and the tubular shaft to be compressed therebetween a cup mounted on the upper end of the shaft concentric with and surrounding the brushing holder and a housing for the tubular shaft and motor.

ALTON H. WILDE.

REFERENCES CITED

The following references are of record in the file of this patent:

UNITED STATES PATENTS

| Number | Name | Date |
| --- | --- | --- |
| 503,740 | Doriot | Aug. 22, 1893 |
| 876,181 | Henry | Jan. 7, 1908 |
| 1,388,630 | Collett | Aug. 23, 1921 |
| 1,500,681 | Murda | July 8, 1924 |
| 1,730,157 | McDonald | Oct. 1, 1929 |
| 1,787,306 | Day | Dec. 30, 1930 |
| 2,093,378 | Wilde | Sept. 14, 1937 |